United States Patent [19]

Griffith et al.

[11] Patent Number: 4,603,389
[45] Date of Patent: Jul. 29, 1986

[54] THREE CUE FLIGHT DIRECTOR SYSTEM FOR HELICOPTERS

[75] Inventors: Carl D. Griffith, Phoenix; Edmund R. Skutecki, Glendale, both of Ariz.

[73] Assignee: Sperry Corporation, New York, N.Y.

[21] Appl. No.: 466,815

[22] Filed: Feb. 16, 1983

[51] Int. Cl.⁴ ............... G06F 15/50; B64C 11/00
[52] U.S. Cl. .................. 364/434; 244/17.13; 244/182
[58] Field of Search ............ 364/427, 428, 433, 434; 73/178 R, 178 H, 178 T; 318/584; 340/946, 967, 970, 977; 244/17.13, 180–182, 194

[56] References Cited

U.S. PATENT DOCUMENTS

| 4,004,756 | 1/1977 | Gerstine et al. | 244/182 |
| 4,005,835 | 2/1977 | Gerstine et al. | 244/182 |
| 4,093,158 | 6/1978 | Clews et al. | 73/178 R |
| 4,109,886 | 8/1978 | Tribken et al. | 73/178 R |
| 4,371,938 | 2/1983 | Wright et al. | 244/17.13 |

Primary Examiner—Gary Chin
Attorney, Agent, or Firm—Howard P. Terry

[57] ABSTRACT

A full time three-cue (roll control, pitch control and collective control) for helicopters flight director and/or autopilot wherein the collective control cue is automatically activated when airspeed is below a predetermined low value or above such value when path errors naturally or manually produced, or airspeed errors exceed predetermined values in magnitude or time.

16 Claims, 2 Drawing Figures

THREE CUE FLIGHT DIRECTOR SYSTEM FOR HELICOPTERS

BACKGROUND OF THE INVENTION

1. Field of the Invention

The present invention relates generally to flight director and/or fully automatic flight control systems for helicopters and more particularly to such systems for providing effective closed loop vertical path control and airspeed control over the normal operating envelope of the helicopter.

2. Description of the Prior Art

Helicopter flight director and/or autopilot systems have been in service for many years and typical of such systems are those disclosed in such of the present Assignee's U.S. Patents as U.S. Pat. Nos. 2,845,623, 2,916,052, 3,916,688, 3,967,236 and 4,109,886 among others. However, it should be pointed out that while the system may be referred to herein as a "three-cue" system, the present invention is concerned primarily with the control of the longitudinal path of the helicopter and hence involves only the cyclic pitch control cue and the collective pitch control cue for commanding the pitch attitude of the helicopter and its vertical movement respectively. Thus, the roll or direction cue is not involved (except when cross controlled with the pitch cue in an entirely conventional manner).

In many prior art three cue systems, when a vertical control mode is engaged, such as glide slope, vertical speed, altitude hold, without engaging an airspeed mode, the path error generated by the flight director computer is supplied to the cyclic pitch cue (or pitch cyclic pitch actuator of the autopilot) and a pitch attitude is commanded in a manner to reduce the path error to zero. However, if the airspeed is not sufficient to produce the required path change, for example, an airspeed less than say 50–70 kts. depending upon the type of helicopter involved, then pitch control alone becomes sluggish and unstable and the additional control of collective pitch becomes essential. Furthermore, if in a cruise mode at higher airspeeds and precise closed loop control of airspeed is required along with tight vertical path control, it is again necessary to engage collective pitch control. In the latter case, mode control logic places airspeed control in the hands off pitch cyclic pitch control and path error in the hands off collective pitch control. However, while tight control of both airspeed and path are achieved, collective pitch will become overly active in the presence of gusts or turbulence. In the flight director mode, this obviously increases pilot work load. Also, since most helicopters employ constant rotor speed control, i.e, collective pitch movement results in a change in engine throttles, such a three-cue system is wasteful of fuel.

Thus, in practice, many helicopter operators prefer to use full three-cue flight director capability at low airspeeds but at higher cruise airspeeds, they prefer to disconnect this collective cue and revert to two cue (roll and pitch) operation where vertical path errors are corrected by pitch cyclic pitch only. Unfortunately, this practice with conventional three-cue flight director/autopilot systems requires the sacrifice of closed loop airspeed control. Moreover, most helicopter autopilots do not provide automatic control of collective pitch and hence pilot's workload is substantially increased when switching from cruise (two-cue) to low speed maneuvering (three-cue).

SUMMARY OF THE INVENTION

The present invention overcomes the above described operational difficulties by providing an effective full-time three-cue capability useable over the entire airspeed and flight path envelope of the helicopter. The system provides automatically activated logic which provides precise path control at both low speeds and high speeds and long-term closed loop control of airspeed during high speed cruise with minimum pilot workload. Thus, short-term path control is controlled by the pitch cyclic control and collective pitch control is only necessary when airspeed deviates outside a predetermined error range, typically ±5 knots. If aircraft trim requirements changes and a smaller airspeed standoff results over a predetermined time period; typically ±2 knots for say 10 seconds, a cyclic pitch change is commanded to compensate for the trim change while path error is maintained near zero by a collective pitch command. Again, pilot workload is reduced but long-term closed loop airspeed control is provided.

BRIEF DESCRIPTION OF THE DRAWINGS

A preferred embodiment of the present invention is illustrated in the accompanying drawings wherein.

DETAILED DESCRIPTION OF THE PREFERRED EMBODIMENT

Figure 1:
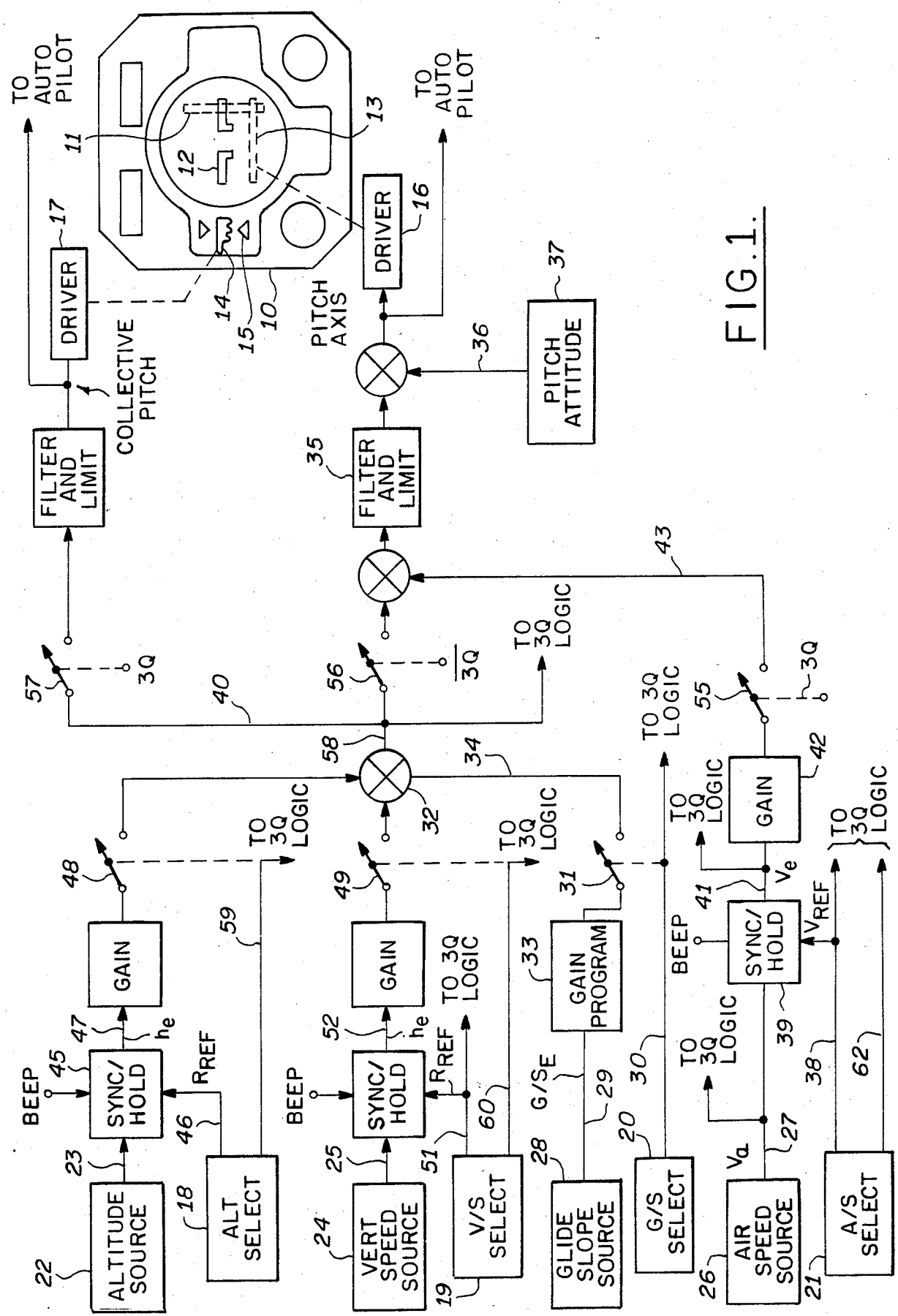
FIG. 1 is a schematic block diagram of a typical helicopter flight director computer and incorporating sources of inputs to the system logic and the switching necessary to carry out the invention.

The longitudinal channel flight director computer system shown schematically in FIG. 1 is quite conventional and is adapted to provide control or command signals to a conventional flight director indicator instrument used by the human pilot to maneuver the helicopter in pitch through the cyclic pitch contol stick and to control direct lift through the collective control stick. The general principles of helicopter flight director control and operation are described in detail in the above referenced U.S. patents and therefore need not be discussed in detail herein. Also the flight director computer output signals and the pitch cyclic cue and collective pitche cue of the flight director may be supplied to corresponding channels of an auto-pilot system for ultimately positioning a pitch cyclic servomotor and a collective pitch servomotor, if the helicopter is so equipped. As stated above, many helicopter autopilots do not include automatic control of collective pitch.

Referring now to FIG. 1, the flight director instrument 10 includes a roll or bank command cue 11 for commanding the pilot to activate the roll cyclic controls in an amount sufficient to zero the cue 11 relative to the reference 12. The roll command channel plays no significant part in the present invention and will not be discussed further. Also, included is a cyclic pitch command cue 13 for commanding the pilot to move the cyclic pitch stick in an amount to zero the cue 13 relative to the reference 12, all in conventional flight director fashion. The collective pitch cue 14 commands the pilot to move the collective pitch control to maintain the cue centered between the direction indicating arrows 15 as described in the above referenced U.S. Pat.

No. 3,967,236. The cyclic and collective cue drivers 16 and 17 may be of the servoed meter movement type as disclosed in Assignee's U.S. Pat. No. 3,577,195 or of the mineature d.c. servomotors type as disclosed in Assignee's U.S. Pat. No. 4,351,187.

The command signals supplied to the cue drivers 16 and 17 may also be supplied to corresponding cyclic pitch and collective pitch autopilot channels for activating their respective servomotors (not shown) in conventional fashion.

The flight director/autopilot may be used to control the helicopter in various modes of operation. For illustrative purposes, four such modes are illustrated in FIG. 1; an altitude hold mode, a vertical speed mode, a glide slope mode and an airspeed hold mode. These modes are established by the pilot through a conventional mode select panel not shown in detail but schematically illustrated in FIG. 1 by blocks 18, 19, 20 and 21 respectively. Each of the modes of course requires a measure of its respective control parameter. A conventional air data computer can supply a signal proportional to the actual altitude of the aircraft illustrated schematically by block 22 and lead 23; a signal proportional to the actual vertical speed of the aircraft illustrated by block 24 and lead 25; and a signal proportional to the actual airspeed of the aircraft illustrated by block 26 and lead 27. A conventional glide slope receiver illustrated by block 28 provides a signal on lead 29 proportional to deviation of the helicopter above and below the glide slope beam of an instrument landing system.

The apparatus and operation of each of the longitudinal path modes illustrated in FIG. 1; i.e. glide slope, altitude hold and vertical speed, will be briefly described as a conventional system, that is, without the benefit of the present invention to provide a background for a better understanding of the invention.

The glide slope mode is the simplest. Upon selection of this mode by the pilot actuating the glide slope (or approach mode select switch 20 on the mode select panel, a mode engage logic signal is provided on lead 30 which effectively closes glide slope switch 31 to supply any glide slope error signal to junction 32. It is of course, standard practice to provide mode interlock logic for assuring no other path modes can be simultaneously commanded. Gain programmer 33 adjusts the gain of the glide slope error signal as a function of the distance of the helicopter from the landing area to provide conventional course softening. Normally, that is, prior to the present invention and if the system does not include an airspeed hold mode, the glide slope error signal is supplied via lead 34 and lead 58 to the flight director cyclic pitch cue driver 16 for actuating the pitch cue 13. Filter and limit 35 is entirely conventional and well understood by skilled workers in the flight director/autopilot art. Also, well understood is the pitch attitude feedback signal in lead 36 from a conventional pitch attitude sensor 37. This signal effectively drives the pitch cue 13 to zero when the pitch attitude is maintained equal to the glide slope error. An asymptotic reduction of the glide slope error results. If the system includes an airspeed hold mode and it is selected with the glide slope mode, normal operation is somewhat different. Also, if the airspeed is so low that aerodynamic forces are not sufficient to correct the glide slope error, some collective pitch control is required. This is best accomplished by including an airspeed hold mode.

The airspeed channel of the flight director computer includes the airspeed signal source 26 which supplies on lead 27 a signal proportional to the existing airspeed of the helicopter. An airspeed selector 21, which may be a select "bug" on a conventional airspeed indicator, provides on lead 38 a signal proportional to the desired airspeed. A synch/hold 39 is a conventional synchronizer, which when not clamped or held, simply follows-up on the actual airspeed signal but when clamped or held supplies an airspeed error signal proportional to the difference between the reference (selected or held) airspeed and the actual airspeed. Thus, when the pilot selects a reference airspeed, the synchronizer 39 is clamped and its output signal on lead 41 is the airspeed error signal.

Returning now to the conventional glide slope mode and assuming the pilot has also selected the airspeed hold mode, the gain programmed glide slope error signal on lead 34 is switched by suitable logic initiated upon airspeed select, from the cyclic pitch driver cue driver 16 to the collective pitch driver 17 via lead 40 and the airspeed error signal on lead 41, after suitable gain adjust by gain 42 is supplied via lead 43 to the cyclic pitch cue driver 16 in place of the glide slope signal. Thus, when the pilot selects the glide slope mode and also the airspeed hold mode, helicopter airspeed is controlled in a closed loop fashion by adjusting pitch attitude while the helicopter glide slope path is controlled in a closed loop fashion by a direct change of lift produced by collective pitch.

The conventional altitude hold mode and vertical speed modes are the same as the glide slope mode. Since helicopter altitude and vertical speed must be capable of supplying selectable values, each of these channels are provided with synch/holds as in the airspeed channel. Thus, the altitude channel includes conventional synch/hold circuitry 45 which follows-up on the actual altitude signal on lead 23 until the altitude hold mode is selected by mode select 18. The selected altitude or altitude reference signal on lead 46 effectively clamps the synchronizer so that its output on lead 47 is a signal proportional to altitude error. Similarly, the vertical speed channel includes conventional synch/hold circuitry 50 which follows-up on the actual vertical speed signal on lead 25 until the vertical speed mode is selected by mode select 19. The selected vertical speed or vertical speed reference signal on lead 51 effectively clamps the synchronizer so that its output signal on lead 52 is a signal proportional to vertical speed error.

As in the glide slope mode, if the pilot has not selected an airspeed hold mode, the altitude error signal is supplied to the cyclic pitch driver 16 so that the altitude error is reduced by controlling helicopter pitch attitude. Vertical speed error is similarly corrected in the absence of the airspeed hold mode. Also, as in the glide slope mode, if the pilot selects the airspeed hold mode, the altitude error signal or vertical speed error signal is supplied to the collective pitch driver 17 while the airspeed error signal is supplied to the cyclic pitch driver 16.

Thus, in general, in conventional flight director operation path errors are corrected by cyclic pitch if an airspeed hold has not also been selected. However, if an airspeed hold has been selected, path errors are corrected by collective pitch control while airspeed errors are corrected by cyclic pitch control.

As stated earlier, the operations just described are almost always followed for low airspeeds, say below 60-65 knots. However, where good closed loop airspeed hold control is desired, such as during high speed cruise in an altitude hold mode, altitude perturbations cause the collective channel to become too active. Since most helicopters use some form of collective stick-to-throttle cross feed to maintain constant rotor speed, the throttles too become overactive and fuel is wasted.

Accordingly, some helicopter operators prefer to remove collective pitch control entirely, that is, three-cue operation, during high speed cruise and revert to a two-cue (pitch and roll) operation wherein vertical path errors are corrected by cyclic pitch. Unfortunately, however, such reversion precludes closed loop control of airspeed. Also, some helicopter autopilots do not provide automatic control of the collective axis so that if airspeed were to be controlled by cyclic pitch, the pilot would have to control path error manually, substantially increasing his work load. Thus, in the prior art flight director/autopilot for helicopters, three-cue operation was dependent upon whether an airspeed function had been selected by the pilot, otherwise only two-cue operation was available.

The present invention provides a substantially improved three-cue helicopter flight director/autopilot system which provides essentially automatic full time three-cue operation. The improved system not only assures tight path control under all airspeed conditions, but also assures good long-term closed loop control of airspeed under all airspeed conditions. The improved system will be described in connection with the basic system of FIG. 1, the 3Q switches 55, 56 and 57 being controlled by the switch control logic illustrated schematically in FIG. 2 in accordance with the mode select discreter 59, 60 and 30, path select switches 18, 19 and 20 respectively, the path error signal on lead 58, the vertical speed reference signal on lead 51, the actual airspeed signal on lead 27, the reference airspeed signal on lead 38, the airspeed error in lead 41 and the state of the airspeed mode engage discrete on lead 61.

Figure 2:
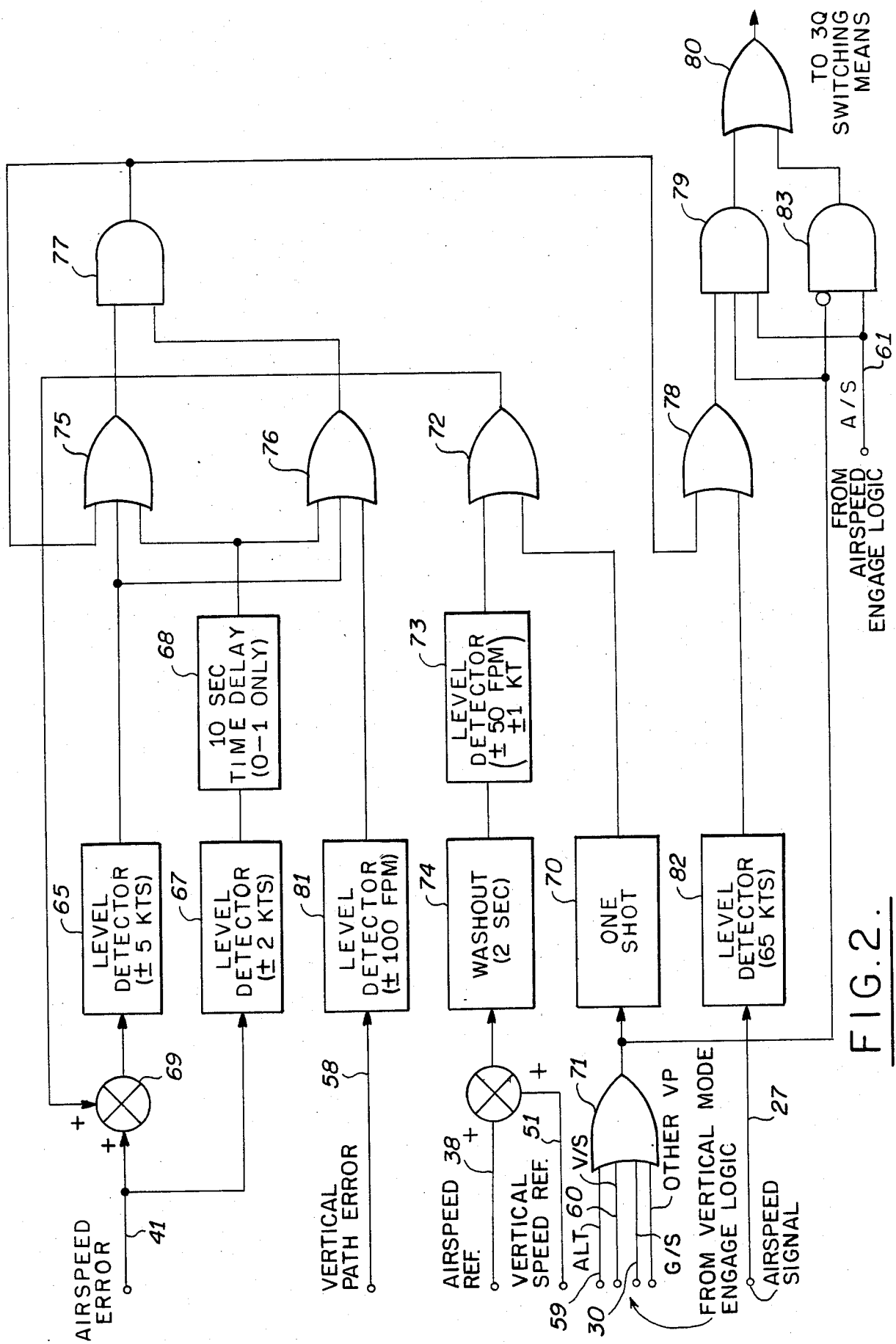
FIG. 2 is a schematic diagram of the control logic used to activate the switches of FIG. 1.

It will be appreciated from the foregoing discussion of the operation of a conventional three-cue helicopter flight director, that its basic three-cue selection logic may be expressed in conventional logic format as $$3Q = IAS$$

where IAS signifies an airspeed select mode engaged. The basic three-cue logic of the present invention as shown in FIG. 2 in conventional logic format is $$3Q = [(IAS) \cdot (\overline{VP})] + [(IAS) \cdot (VP) \cdot (PE)]$$

where
IAS = airspeed select mode engaged
VP = vertical path mode engaged
PE = path error > predetermined value Before discussing the three-cue logic of FIG. 2, it should be pointed out that a further conventional operational capability is shown in FIG. 1, and that is the ability of the pilot to slew any of the path control synch/holds as well as the airspeed synch/hold to new values by means of conventional "beep" switches on the control columns. These are illustrated schematically in FIG. 1 and serve to establish new vertical path and/or airspeed references without the pilot having to remove his hands from the controls. It is obvious that these beeper switches constitute alternate path reference select apparatus.

Referring now to FIG. 2, the overall operation of the three-cue logic is as follows. It will be understood that the values given to the various parameters are only typical and that other values may be assigned depending upon the type of helicopter involved and its normal operating characteristics. The pilot will be supplied three-cue flight director information whenever an airspeed mode is engaged, and a vertical path mode is selected and any of the following conditions are met:

(a) the airspeed error exceeds 5 knots, or
(b) the airspeed error exceeds 2 knots for 10 seconds, or
(c) a vertical path mode change is commanded (e.g. by switching from altitude hold to vertical speed hold), or
(d) the airspeed or vertical speed reference is changed (e.g. by resetting the airspeed or vertical speed selector ("bug" or by using the "beeper" switches).

After three-cue operation has been established, the 3Q logic remains engaged until
(e) the airspeed error is less than one knot, and
(f) the vertical path error is less than 100 ft. per minute. Furthermore, three-cue mode is permanently engaged if
(g) a vertical path mode is engaged, and
(h) the airspeed mode is engaged, and
(i) the actual airspeed is less than 65 knots.

The first of the foregoing conditions (a) is provided by a level detector 65 responsive to the airspeed error signal on lead 41 and provides a high output when airspeed error exceeds ±5 knots. The second condition (b) is provided by the level detector 67 and timer 68 which are also responsive to the airspeed error signal on lead 41 and which also supply a high output to OR gate 66 when the airspeed error exceeds ±2 knots for a period greater than 10 seconds. This is an indication of an out-of-trim condition of the helicopter. It will be understood that the time delay is designed to supply a high output only when the level detector 67 signal goes from a low to a high; there is no time delay when the level detector signal goes from a high to a low. Also, it will be appreciated that the level detectors 65 and 67 are conventionally designed with internal feedbacks which provide sufficient hysteresis to maintain their outputs high until their inputs have dropped to less than one knot. Furthermore, level detector 65 also switches high, if not already in that state, whenever the input to junction 69 goes high. The third condition (c) is provided by one-shot 70 which conventionally provides a high at its output whenever the pilot switches to a different vertical path mode as detected by OR gate 71 responsive to the mode select discretes on leads 30, 59 or 60. The high output of one-shot 71 fed through OR gate 72 is fed back to junction 69 to thereby switch level detector 65 high if it is not already in that state. The fourth logic condition (d) is provided by level detector 73 which provides a high output whenever the airspeed or vertical speed reference is changed by more than ±1 knot or ±50 feet per minute, respectively. This is accomplished by monitoring these respective signals on leads 38 and 51. It will be noted that a wash-out 74 having a two-second-time constant is provided so that the detector 73 may be conditioned for any subsequent changes in the airspeed and vertical speed references.

Thus, outputs of level detectors 65 and 67 are supplied to OR gates 75 and 76, the respective outputs of which are then supplied to AND gate 77 so that if either of the outputs of detectors 65 and 67 are high the AND condition of gate 77 is satisfied and its output goes high. Since AND gate 77 output is high, the condition of a further OR gate 78 is also satisfied and its output goes high. AND gate 79 is responsive to the logic state of OR gate 78, the vertical path select OR gate 71 and the airspeed mode engage discrete on lead 61. Assuming the pilot has selected an airspeed mode and a vertical path mode, the output of AND gate 79 goes high so as to satisfy the OR condition of OR gate 80 thus providing a logic high at its output.

Returning back to FIG. 1, the 3Q switches 55, 56 and 57 are controlled by the state of the output of OR gate 80 of FIG. 2. As schematically indicated by the 3Q notations in FIG. 1, when the output of gate 80 goes high, switch 55 closes, switch 56 opens and switch 57 closes. Thus, when 3Q conditions are met, as set forth above, the path control signals are removed from the pitch cyclic cue driver 16 and supplied to the collective pitch cue driver 17 while the airspeed control signal is supplied to the pitch cyclic cue driver 16.

As stated above, 3Q operation will continue until or unless conditions (e) and (f) occur. Referring again to FIG. 2, detection of these conditions will be described. When the airspeed is reduced to below ±1 knot as the result of 3Q operation, the level detector 65 output signal goes low; this condition is also detected by level detector 67 and since the time delay 68 is not effective for reducing airspeed errors, its output likewise goes low, thereby producing low inputs to OR gates 75 and 76 and satisfying condition (e) above. However, if there is still a vertical path error, it is desirable to maintain 3Q operation in order to quickly reduce this error. The ±100 foot per minute level detector 81 responsive to the path error signal on lead 58 provides this function. With a vertical path error greater than ±100 feet per minute, level detector 81 output is high. Therefore, even though the airspeed error may reduce to less than ±1 knot, the state of AND gate 77 will not change due to its feedback to the input of gate 75 and 3Q operation will continue. However, when the vertical path error reduces to below ±100 feet per minute, the output of detector goes low and since OR gate 75 continues to supply a high input to AND gate 77, the state of gage 77 reverses and goes low thereby reverting the flight director to two-cue operation.

As stated above, 3Q operation is desired whenever the airspeed is below 65 knots if a vertical path mode and airspeed control have been selected by the pilot; i.e. conditions (g), (h) and (i) above. 3Q operation is assured by level detector 82 responsive to the actual airspeed signal on lead 27 which when the airspeed is below 65 knots, its output is low maintaining a high at the input of AND gate 79. However, if the airspeed is above 65 knots, 3Q operation occurs only under the conditions discussed above.

Lastly, in accordance with the 3Q logic equation above, if no vertical path mode has been selected by the pilot but an airspeed mode has, 3Q operation is desired. This is provided by AND gate 83 responsive to the airspeed engage discrete on lead 61 and an inverted output of vertical mode select OR gate 71.

From the foregoing, it is now evident that the flight director/autopilot of the present invention provides essentially full time 3Q operation automatically so that short term collective pitch motions are minimized without sacrificing long term path and airspeed tracking capability or instability. This results in substantially reducing pilot work load while at the same time increasing fuel economy. The system assures that the flight director (and/or autopilot) automatically switches between two-cue and three-cue operation dependent upon the magnitude of path errors or pilot commands and during high speed cruise, collective path control commands are supplied only when a trim correction is required by the cyclic pitch to maintain the desired airspeed.

While the invention has been described in its preferred embodiments, it is to be understood that the words which have been used are words of description rather than of limitation and that changes may be made within the purview of the appended claims without departing from the true scope and spirit of the invention in its broader aspects.

We claim:

1. A flight control system for helicopters having rotor cyclic pitch command means for controlling the pitch attitude therof and rotor collective pitch command means for controlling the direct lift thereof, said system being operable in a first condition of operation to supply vertical path and airspeed error signals only to said cyclic pitch command means and in a second condition of operation to supply airspeed error signals to said cyclic pitch command means and vertical path error signals to said collective pitch command means, said system comprising
   (a) airspeed reference mode select means and means responsive thereto for providing an airspeed mode select signal and an airspeed error signal corresponding to airspeed departures of said helicopter from a reference airspeed,
   (b) vertical flight path mode select means and means responsive thereto for providing a path mode select signal and an error signal corresponding to vertical path departures of said helicopter from a selected flight path,
   (c) first logic means responsive to said airspeed mode select signal and to the absence of said vertical path mode select signal for providing a first logic signal,
   (d) second logic means responsive to said airspeed reference mode select signal, said vertical path mode select signal and to said vertical path error signal exceeding a predetermined value for providing a second logic signal, and
   (e) logic gate means responsive to said first logic signal and said second logic signal for operating said system in said second condition of operation.

2. The flight control system as set forth in claim 1 wherein said means for providing said second logic signal includes level detector means responsive to said airspeed error signal exceeding a predetermined value for providing a further logic signal.

3. The flight control system as set forth in claim 1 wherein said means for providing said second logic signal includes
   (a) level detector means responsive to said airspeed error signal exceeding a second predetermined value, and
   (b) time delay means responsive to said level detector means for providing a further logic signal after a predetermined time period.

4. The flight control system as set forth in claim 1 wherein said vertical flight path mode select means includes means for selecting a plurality of vertical flight path modes and wherein said means for providing said second logic signal includes means responsive to a change from one vertical flight path mode to another for providing a further logic signal.

5. The flight control system as set forth in claim 4 wherein said plurality of flight path modes includes an altitude hold mode, a vertical speed mode and a glide slope mode.

6. The flight control system as set forth in claim 5 wherein said vertical speed mode includes means for selecting a vertical speed reference and means responsive thereto for providing a vertical speed error signal corresponding to vertical speed departures of said helicopter from said vertical speed reference and wherein said means for providing said second logic signal includes level detector means responsive to a change in said vertical speed reference exceeding a predetermined value for providing said further logic signal.

7. The flight control system as set forth in claim 1 wherein said means for providing said second logic signal includes level detector means responsive to a change in said reference airspeed exceeding a predetermined value for providing a further logic signal.

8. The flight path control system as set forth in claim 2 wherein said means for providing said second logic signal includes OR logic gate means responsive to said further logic signal.

9. The flight path control system as set forth in claim 3 wherein said means for providing said second logic signal includes OR logic gate means responsive to said further logic signal.

10. The flight path control system as set forth in claim 4 wherein said means for providing said second logic signal includes OR logic gate means responsive to said further logic signal.

11. The flight path control system as set forth in claim 6 wherein said means for providing said second logic signal includes OR logic gate means responsive to said further logic signal.

12. The flight path control system as set forth in claim 7 wherein said means for providing said second logic signal includes OR logic gate means responsive to said further logic signal.

13. The flight control system as set forth in claim 2 wherein said level detector means changes the state of said further logic signal upon said airspeed error reducing to a value less than said predetermined value whereby to change the state of said second logic signal and to provide operation of said system in said first condition of operation.

14. The flight control system as set forth in claim 3 wherein said level detector means changes the state of said further logic signal upon said airspeed error signal reducing to a value less than said predetermined value whereby to change the state of said second logic signal and to provide operation of said system in said first condition of operation.

15. The flight control system as set forth in claim 1 wherein the means for providing said second logic signal includes
(a) level detector means responsive to the actual airspeed of the helicopter reducing to a value less than a predetermined value for maintaining the operation of said system in said second condition of operation.

16. A flight control system for helicopters having rotor cyclic pitch command means for controlling the pitch attitude thereof and rotor collective pitch command means for controlling the direct lift thereof, said system comprising
(a) means for providing a signal representative of a desired vertical flight path and means responsive thereto for providing a path error signal corresponding to vertical path departures of said helicopter from said desired flight path,
(b) airspeed reference means and means responsive thereto for providing an airspeed error signal corresponding to airspeed departures of said helicopter from a reference airspeed,
(c) switch means operable in a first position to supply said path error signal to said cyclic pitch command means, and in a second position to supply said path error signal to said collective pitch command means and said airspeed error signal to said cyclic pitch command means, and
(d) logic means coupled to operate said switch means for transferring said switch means from said first position to said second position upon said airspeed error signal exceeding a predetermined value, and upon said airspeed error signal reducing to a value less than said predetermined value transferring said switch means from said second position to said first position.

* * * * *